United States Patent [19]
Santi et al.

[11] Patent Number: 5,790,005
[45] Date of Patent: Aug. 4, 1998

[54] LOW PROFILE COUPLED INDUCTORS AND INTEGRATED MAGNETICS

[75] Inventors: Enrico Santi, Aliso Viejo; Slobodan Cuk, Laguna Hills, both of Calif.

[73] Assignee: Optimum Power Conversion, Inc., Irvine, Calif.

[21] Appl. No.: 668,975

[22] Filed: Jun. 24, 1996

[51] Int. Cl.[6] .................................................. H01F 3/00
[52] U.S. Cl. ................................................... 335/296
[58] Field of Search ........................ 363/16, 20; 335/296, 335/297, 302, 304, 306; 336/165, 174, 178, 220

[56] References Cited

U.S. PATENT DOCUMENTS

| | | |
|---|---|---|
| 4,184,197 | 1/1980 | Cuk et al. ................................. 363/16 |
| 4,257,087 | 3/1981 | Cuk .......................................... 363/16 |
| 4,675,796 | 6/1987 | Gautherin et al. ....................... 363/20 |
| 4,864,478 | 9/1989 | Bloom ...................................... 363/16 |
| 5,440,472 | 8/1995 | Sturgeon .................................. 363/20 |

OTHER PUBLICATIONS

"Electrical Circuits and Systems", A. M. Howatson, Oxford University Press, pp. 130–134, 1996.

*Primary Examiner*—Matthew V. Nguyen
*Attorney, Agent, or Firm*—A. M. Fernandez

[57] ABSTRACT

In a dc-to-dc converter, input and output inductors loosely coupled and isolation transformer windings closely coupled are implemented on a UI magnetic core in such a manner as to satisfy a zero-ripple condition $k_i=n$ of current in the output inductor, where n is a turns ratio of the loosely coupled input and output inductors, and both inductors are chosen to have the same number of turns, and that number is an integer such that the value of the coupling coefficient $k_1$ required to satisfy the zero-ripple condition is one achieved by modeling of core leakages instead of by adjusting the turns ratio n, thus making it feasible to implement the coupled inductors, and the transformer windings as well, in a single UI core and modeling the core losses by configuring the core. It is then possible to implement the core legs that are long enough to just accommodate a printed circuit board on which all of the windings are manufactured for a low profile package with both inductor windings on the same leg opposite the transformer windings. If the input inductor is on the same leg of the core as the transformer windings, adding an external inductor in series with the input inductor will filter any ripple current coupled into it by the transformer flux.

17 Claims, 9 Drawing Sheets

$R_\ell, R_{\ell 1}, R_{\ell 2}$ constant

5,790,005

LOW PROFILE COUPLED INDUCTORS AND INTEGRATED MAGNETICS

FIELD OF THE INVENTION

This invention relates to coupled inductors and integrated magnetics of small size and weight for such applications as switching power converters.

BACKGROUND OF THE INVENTION

Separate inductors in a switching power converter can be magnetically coupled together with significant advantages. The term "coupled inductors" is used to indicate the magnetic coupling of two inductors and the term "integrated magnetics" to indicate the magnetic coupling of three or more inductors in the switching converter.

In certain switching power converter topologies like Ćuk and Sepic converters, various magnetic elements can be combined together in coupled inductor and integrated magnetics arrangements. If a certain zero current ripple condition is met, current ripple can be steered into one of the windings, leaving all the other ones virtually ripple free. For example, in an isolated Ćuk converter shown in FIG. 1a, an input inductor $L_1$ and output inductor $L_2$ can be combined with the transformer windings $L_p$ and $L_s$ together on one core structure which is referred to herein as an integrated magnetics structure. All current ripple can be steered into the transformer easing the filtering requirements at both input and output.

A different approach to magnetics implementation called "flat magnetics" has emerged in recent literature. Flat magnetics are low-profile magnetics with windings realized using printed circuit board (PCB) techniques. The main advantage is the low profile that allows the converter to meet a 0.5" height requirement of an electronics plug-in PCB. Equally important is the elimination of the expense of manually winding and terminating the windings which are automated in PCB processing techniques. Thus, an object of this invention is to address various issues regarding the design of flat integrated magnetics useful in the Ćuk dc-to-dc converter and other converter circuits, such as the SEPIC converter.

Before addressing the various issues, underlying principles will first be discussed. The basic concept of coupled inductors is disclosed in U.S. Pat. No. 4,184,197 incorporated herein by reference. That concept was extended to integrated magnetics in U.S. Pat. No. 4,257,087, also incorporated herein by reference, for any converter with inductors having proportional voltage waveforms. An example of such a converter is shown in FIG. 1a.

A major advantage of the coupled inductors is that even zero current ripple can be achieved in either the input or the output circuit when the coupled inductors are designed to satisfy the condition $k_1=n$, where $k_1$ is the coupling coefficient and n is the turns ratio of the coupled inductors.

The concept of integrated magnetics disclosed in the aforesaid U.S. Pat. No. 4,257,087 is in general that if in a switching power converter there are a number of inductors and transformer windings with proportional voltage waveforms, they can all be magnetically coupled in an integrated magnetics structure as shown in either FIG. 1b or FIG. 1c with significant reduction of physical size, and reduced switching ripple can still be obtained if the aforesaid zero ripple condition $k_1=n$ is met. All inductors but one can have zero current ripple, and all ripple is steered into the remaining inductor.

For complete understanding of the present invention, it is important to fully appreciate the basic concept of coupled inductors in a switching power converter. Therefore, the zero current ripple phenomenon first disclosed in the aforesaid U.S. Pat. No. 4,184,197 will now be reviewed with reference to FIG. 2a and the zero ripple condition referred to above derived. Alternative magnetic structures are shown in FIGS. 2b and 2c. For simplicity, the case of identical voltage waveforms on the two inductors $L_1$ and $L_2$ is considered. The case of proportional voltage waveforms is an obvious extension of this special case.

An equivalent circuit model for coupled inductors is the same as the leakage inductance model of a transformer shown in FIG. 3. The two identical voltage generators $V_1$ and $V_2$ represent the identical voltages applied to respective windings of the coupled inductors $L_1$ and $L_2$ by the converter operation. Assuming that the voltage generator $V_2$ is disconnected (switch SW open), the coupling coefficient of the winding of inductor $L_1$ is defined as $$k_1 = \frac{\phi_m}{\phi_m + \phi_{l1}} \tag{1}$$

where $\phi_m$ is the coupled flux and $\phi_{l1}$ is the leakage flux. It should be noted that this definition is different from the standard definition of coupling coefficient.

Since an inductor $N\phi=Li$, Equation (1) becomes $$k_1 = \frac{L_m i/N_1}{L_m i/N_1 + L_{l1} i/N_1} = \frac{L_m}{L_m + L_{l1}} \tag{2}$$

Therefore, $k_1$ is the inductive voltage divider ratio of the model of FIG. 3. Voltage $V_p$ at the primary of the ideal transformer has the same wave-shape of input voltage $V_1$ but reduced in magnitude by a factor $k_1$ as shown in FIG. 3. The turns ratio of $n=N_1/N_2$ can be chosen to step up the secondary voltage to the input voltage $V_1$. At this point, if a voltage from the generator $V_2$ equal to that of the primary voltage generator $V_1$ is applied to the winding of inductor $L_2$ (switch SW of FIG. 3 closed), there will be no ripple current because the same voltage appears on both sides of equivalent leakage inductance $L_{l2}$. Therefore, the zero ripple condition is $$k_1 = n \tag{3}$$

In conclusion, there is zero current ripple on the winding of inductor $L_2$ when the winding of inductor $L_1$ by itself induces on the winding of inductor $L_2$ a voltage exactly identical to the voltage on the winding of inductor $L_1$. To achieve that, the turns ratio is normally adjusted to compensate for leakage loss. Notice also that, unlike for transformers, a big leakage inductance is desirable for coupled inductors. This is because in practice the voltages generated by operation of the converter to inductors $L_1$ and $L_2$ will not be exactly identical, which will cause some residual ripple that is effectively canceled by the leakage inductance or at the very least is limited by the leakage inductance.

From the foregoing discussion, it is clear that a zero ripple design requires accurate modeling of core leakages to determine the value of $k_1$ required to satisfy the zero-ripple condition with n=1, i.e., with both inductors having the same integer of turns which is the gist of the present invention and the key to the solution of several problems, such as the implementation of integrated magnetics with a low profile using printed circuit techniques. A reluctance model which will now be described is an ideal tool in design of coupled inductors. In that regard, it should be stressed that reluctance of flux paths in the magnetic material is neglected in the reluctance models discussed below with reference to this invention. This assumption is acceptable as long as gaps in the core are big enough to dominate the reluctance of the flux path. This is a good assumption in the case of inductors that carry dc currents.

The reluctance model used in the past is shown in FIG. 4. The reluctance of the total gap is represented by reluctance $R_x$. For example, in the case of FIG. 2b or FIG. 2c, $R_x$ is the reluctance of the two gaps combined. Each winding has its own leakage flux, which is characterized by leakage reluctances $R_{l1}$ and $R_{l2}$. Flux paths in air are assumed to be independent of gap size and therefore these reluctances $R_{l1}$ and $R_{l2}$ are constant. An experiment will now be described that can be used to show that this $\pi$ model of FIG. 4 does not correctly describe magnetic structures with gaps on both legs of a UI core as shown in FIGS. 2b and 2c.

This experiment, to be described with reference to FIGS. 5a, 5b and 5c, dramatically demonstrates the effect of gap position on the characteristics of the magnetic structure and, at the same time, the inadequacy of the old model shown in FIG. 4. The two inductors $L_1$ and $L_2$ on an UU60 magnetic core (represented in the figures for simplicity as a UI core) have the same number of turns. Inductor $L_1$ is driven with a sinusoidal voltage source $V_1$ and inductor $L_2$ is left open. The following measurements made in the experiment are: coupling coefficient $k_1$, inductance $L_1$ seen from the source $V_1$ and radiated noise measured with a telephone pickup placed at a fixed distance from the core structure. Limiting radiated noise is important from a practical point of view if the power supply is to be placed physically close to noise-sensitive equipment like a magnetic storage device in a computer.

These measurements are repeated for the three different gap arrangements illustrated in FIGS. 5a, 5b and 5c. The total gap is the same in all three cases, and therefore reluctance $R_x$ in the model of FIG. 4 remains the same. Leakage reluctances $R_{l1}$ and $R_{l2}$ are expected to be independent of the gaps and therefore the three coupled inductor structures of FIGS. 5a, 5b and 5c have identical reluctance models. (The total core gaps shown in all figures are equal.) Consequently, very similar results for the three measurements are expected, but the experimental measurements for the structures in FIGS. 5a, 5b and 5c show that is not the case. The coupling coefficient $k_1$ varies dramatically from 0.98 to 0.57. The value of inductance $L_1$ and radiated noise is also significantly different in the three structures. These variations cannot be explained by the model of FIG. 4. Since total gap reluctance $R_x$ is the same in the three cases, the only way to obtain good agreement between model and experiment is to arbitrarily assign three different values to leakage reluctance $R_{l1}$ in the three cases ($R_{l2}$ does not affect the measurements because current $i_2$ in the winding for the inductor $L_2$ is zero and therefore the equivalent voltage source $n_2 i_2$ is shorted).

The results of this experiment can be qualitatively explained as follows. Look, for example, at the value of coupling $k_1$ for the coupling structures of FIGS. 5a and 5b where $k_1$ equals 0.98 and 0.57, respectively, for the two structures which differ in the position of a single core gap. In the first structure (FIG. 5a), coupling is almost perfect (0.98) while in the second structure it is only 0.57. Because the gap is very close to inductor $L_1$ in the first structure, the mmf due to the current in the winding of inductor $L_1$ drops on the gap so that most of the UI core (except the portion between the winding of inductor $L_1$ and the gap) is at a constant magnetic potential. As a result, the leakage in air is small and most of the flux couples with the winding of inductor $L_2$ so that coupling is good. In the second structure (FIG. 5b), the gap is far from the winding of inductor $L_1$. The upper part of the U piece and the I piece of the core are at different magnetic potentials, so there is significant leakage flux and coupling is much worse.

An alternative explanation is as follows. The leakage flux can be divided into two parts $\phi_{l1}$ and $\phi_l$, as shown in FIGS. 5a through 5c. Flux $\phi_{l1}$ closes in the air before reaching the gap on leg A-D in FIG. 5a and flux $\phi_l$ closes in the air after crossing the gap on leg A-D. Flux $\phi_{l1}$ is not affected by the size of the gap on that leg in FIG. 5a and so is the same in the two structures of FIGS. 5a and 5c. On the other hand, flux $\phi l$ is different in the structures of FIG. 5a and FIG. 5b. In the case of FIG. 5a, flux $\phi l$ goes through the gap on the leg A-D, whereas in the structure of FIG. 5b there is no gap on the leg A-D but instead on the leg B-C. Therefore, in the case of FIG. 5a, flux path $\phi l$ has higher reluctance and flux $\phi l$ is smaller than in the structure of FIG. 5b. Smaller leakage flux means better coupling and indeed the measurement shows better coupling for the structure of FIG. 5a. The different values of inductance $L_1$ and radiated noise can be explained by similar reasoning: leakage flux is bigger for the structure of FIG. 5b, and since leakage flux contributes to the value of inductance $L_1$, its value is greater (11.07 mH) in the structure of FIG. 5b as compared to 6.42 mH in the structure of FIG. 5a. The difference in radiated noise can also be explained following the same line of reasoning: radiated noise is leakage flux, and therefore it is greater (1.3V) in the structure of FIG. 5b as compared to 0.12V in the structure of FIG. 5a. Note the values of parameters $k_1$, $L_1$ and noise for the structure of FIG. 5c as compared to FIGS. 5a and 5b:

|  | FIG. 5a | FIG. 5b | FIG. 5c |
| --- | --- | --- | --- |
| $k_1$ | 0.98 | 0.57 | 0.72 |
| $L_1$ | 6.42 mH | 11.07 mH | 7.13 mH |
| Noise | 0.12 V | 1.3 V | 0.85 V |

The conclusion to be reached from the foregoing discussion is that leakage flux from the windings of the inductors $L_1$ and $L_2$ must be divided into two parts: fluxes $\phi_{l1}$ and $\phi_{l2}$ that close in air before crossing the gap and flux $\phi_l$ that closes in air after crossing the gap. This is shown in FIG. 6a which is the structure of FIG. 5c. A new reluctance model for the structure of FIG. 6a is shown in FIG. 6b. $R_{x1}$ and $R_{x2}$ are the reluctances of gaps $x_1$ and $x_2$. $R_{l1}$ and $R_{l2}$ are the reluctances of flux paths in air that do not cross the gaps. $R_l$ is the reluctance of leakage flux paths that cross the gaps. Measurements on different cores show that for a given core geometry reluctances $R_{l1}$, $R_{l2}$ and $R_l$ are constant irrespective of gap arrangement and gap sizes used. Only $R_{x1}$ and $R_{x2}$ depend on the gaps $x_1$ and $x_2$.

Reluctances $R_l$, $R_{l1}$ and $R_{l2}$ can be experimentally determined from a single set of measurements. Since gap dimensions are known, reluctances $R_{x1}$ and $R_{x2}$ can be calculated from a well-known formula. That leaves three unknowns: $R_{l1}$, $R_{l2}$ and $R_l$. A nonsaturated coupled-inductor structure is a linear reciprocal two-port magnetic circuit and three independent measurements can be performed. Therefore, the three unknowns can be experimentally determined. The main advantage of this new reluctance model is that from a single set of measurements on a certain core with any value of gaps, reluctances $R_{l1}$, $R_{l2}$ and $R_l$ can be uniquely determined. These leakage reluctances completely characterize the core and the model accurately describes the magnetic structure for any other values of gaps.

New Simplified Reluctance Model

Measurements for various standard cores show that $R_{l1}$ and $R_{l2}$ are an order of magnitude bigger than $R_l$. Therefore, $R_{l1}$ and $R_{l2}$ can be neglected without introducing significant errors.

Neglecting reluctances $R_{l1}$ and $R_{l2}$ in the reluctance model of FIG. 6b reduces the old $\pi$ reluctance model of FIG. 4 to a T model shown in FIG. 6c. An advantage of this new simplified T model as compared to the new complete model of FIG. 6b is that it can be fully determined from a single set of measurements. Otherwise, in the new complete model it would be necessary to assume that reluctances $R_{x^1}$ and $R_{x^2}$ are known.

At this point, it is instructive to compare the old $\pi$ model of FIG. 4 with the new simplified T model of FIG. 6c. It is clear that one model can be obtained from the other with a Y–Δ transformation. In general any two-port magnetic circuit has a $\pi$ model and an equivalent T model, but in the case of the T model, the advantage is that leakage reluctance $R_l$ is constant and independent of gaps, whereas leakage reluctances $R_{l1}$ and $R_{l2}$ in the $\pi$ model of FIG. 4 vary with changes in the gaps. That makes the new T model a more useful tool for design than the old $\pi$ model.

Problems of Coupled Inductor and Integrated Magnetics

As noted hereinbefore, coupled inductors and integrated magnetics provide significant advantages over conventional magnetics implementation of switching converters. However, there are a number of outstanding problems. Since the coupled inductors carry dc currents, air gaps in the magnetic path are needed to prevent magnetic saturation. These gaps are often big and significant fringing flux results. This causes eddy current losses in nearby conductors and radiated noise.

Another problem is that a rather complicated adjustment for ripple reduction is needed. Knowledge of the coupled inductor leakages is required. In a coupled inductor design with a small number of turns, an "integer" problem is encountered due to the fact that a winding can only have a number of turns that is an integer. Suppose that in a conventional design the ripple-carrying winding has one turn. The other winding may have either one or two (or more) turns. If one turn is used, no adjustment for zero ripple can be made and significant residual ripple results. If two turns are used, zero ripple can be achieved, but only if $k_1=0.5$ as can be seen from Equation (3). Since values of $k_1=0.7\div0.8$ are the norm, a huge gap would be needed to achieve $k_1=0.5$, which in turn introduces associated problems of fringing flux and eddy current losses. This invention provides alternative solutions to these problems that are more viable.

STATEMENT OF THE INVENTION

The new reluctance T model provides powerful insight to the design of coupled inductors and integrated magnetics which are the subject of the invention to make it possible to achieve zero current ripple with the same number of turns on the two coupled inductors.

In accordance with the present invention, input and output coupled inductors $L_1$ and $L_2$ in a switching dc-to-dc converter will have no ripple current when the zero ripple condition $k_1=n$ is satisfied, where $k_1$ is the coupling coefficient of inductor $L_1$ to inductor $L_2$ and n is the turns ratio $N_1/N_2$, and both $N_1$ and $N_2$ are integer numbers. To avoid making fractional turn adjustments in the turns ratio, core leakages are adjusted to set the value of $k_1$ for a set turns ratio n in which each turn of both inductors is complete.

In one embodiment of the invention using a UI magnetic core, the turns ratio $N_1/N_2$ of the inductors wound on opposite legs of the core is set equal to one, and an air gap is provided in only the leg on which the input inductor $L_1$ is wound to increase the coupling coefficient of the input inductor $L_1$ such that $k_1=n$ and $n=1$, thereby providing ripple-free current in the output inductor $L_2$. This first embodiment of the invention allows precise design of peak flux density on each leg of the magnetic core by selecting the cross section of one leg as compared to the other of the UI magnetic core.

A second embodiment uses a magnetic core that utilizes an I-shaped piece for the input inductor leg with the designed gap for that leg divided with half the gap provided at each end. In the case of a designed gap being provided in the leg on which the output inductor is wound, that gap also may be divided in the same manner as the designed gap for the input leg with the same advantage, namely reducing fringing flux at the gap.

These techniques for design of coupled inductors may be used advantageously in the design of flat magnetics for coupled inductor with a low profile and may also be used advantageously in the design of integrated magnetics for coupled inductors and an isolation transformer. In the case of coupled inductors as well as the case of integrated magnetics, the coupled inductors or the coupled inductors and transformer windings are provided on a printed circuit board (PCB) with the primary and secondary windings of the transformer. The coupled inductor arrangement on a UI with the same number of turns ($N_1=N_2$) on opposite legs where a gap on only one leg can be extended to the case of integrated magnetics of more than two windings to include an isolation transformer with ripple carrying windings $L_p$ and $L_s$ closely coupled on one leg and the input and output inductor windings $L_1$ and $L_2$ loosely coupled on the other leg for zero ripple in the output winding $L_2$.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 11a illustrates improved integrated magnetics for coupled inductors $L_1$ and $L_2$ and isolation transformer windings $L_p$ and $L_s$ for the Ćuk converter of FIG. 1a.

DETAILED DESCRIPTION OF THE INVENTION

Figure 2A:
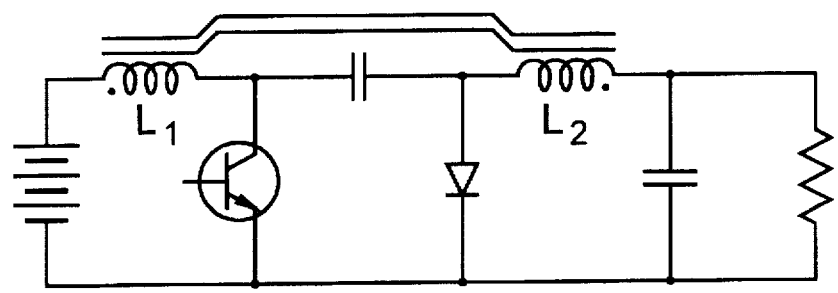
FIG. 2a is a schematic diagram of a prior-art coupled inductor Ćuk converter without isolation of the output circuit from the input circuit.
Figure 2B:
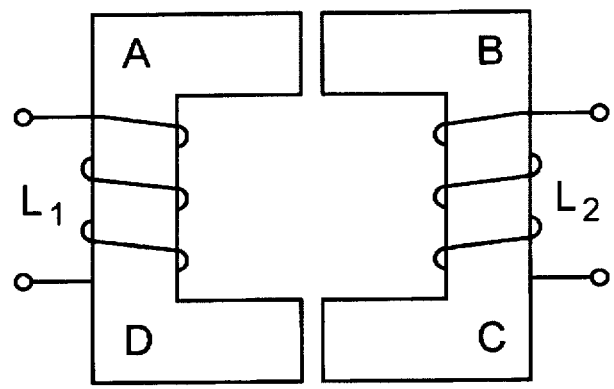
FIGS. 2b and 2c illustrate two alternative structures for the coupled inductors.
Figure 2C:
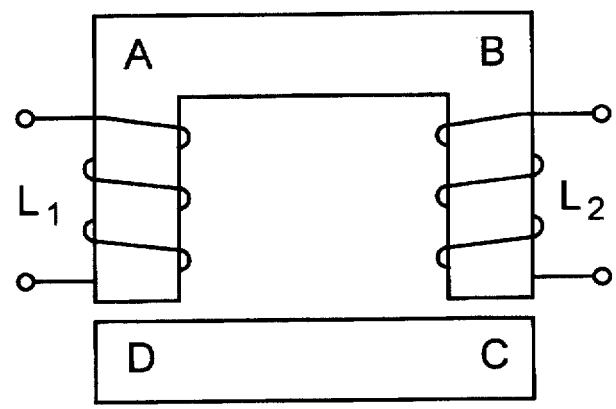
Figure 3:
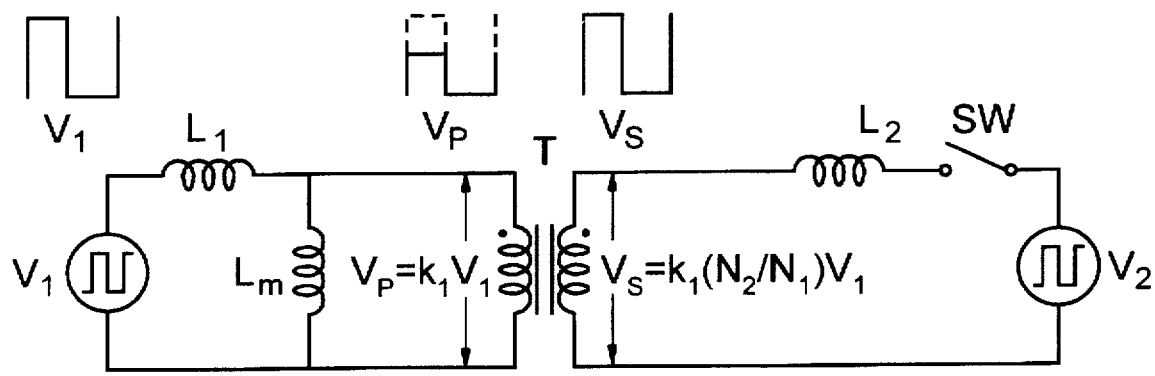
FIG. 3 is an equivalent circuit model for coupled inductors that satisfy a zero-ripple condition that $k_1=N_1/N_2$.
Figure 4:
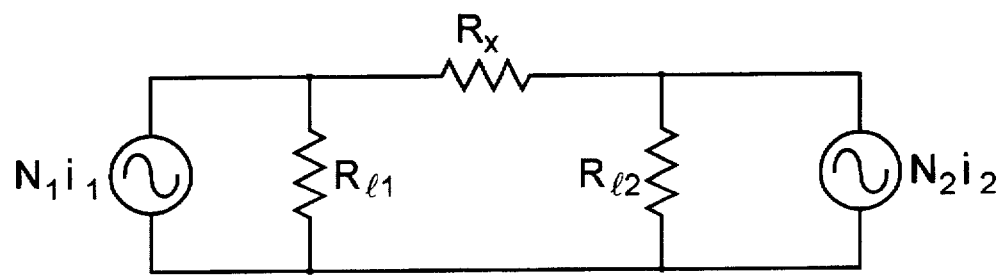
FIG. 4 illustrates an old $\pi$ reluctance model for coupled inductor structures of the type shown in FIG. 2b and FIG. 2c.
Figure 6B:
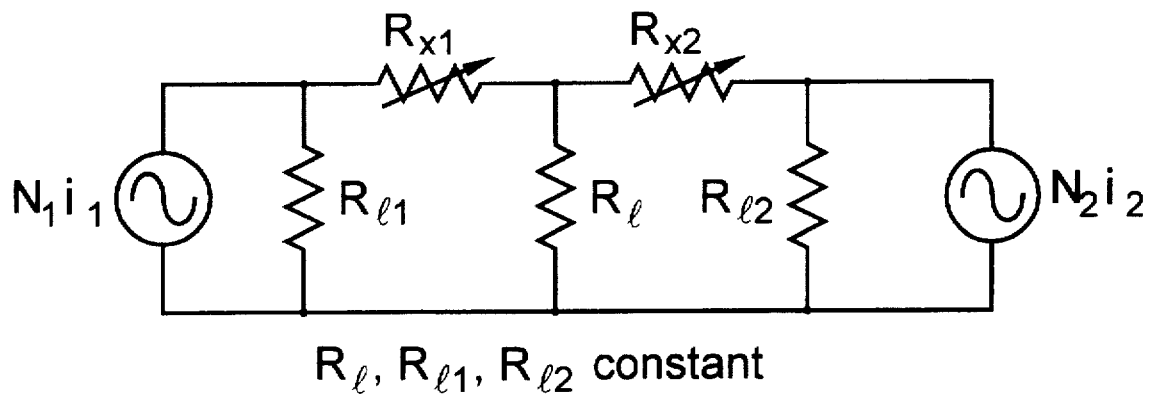
FIG. 6b shows a new reluctance model for that structure.
Figure 6C:
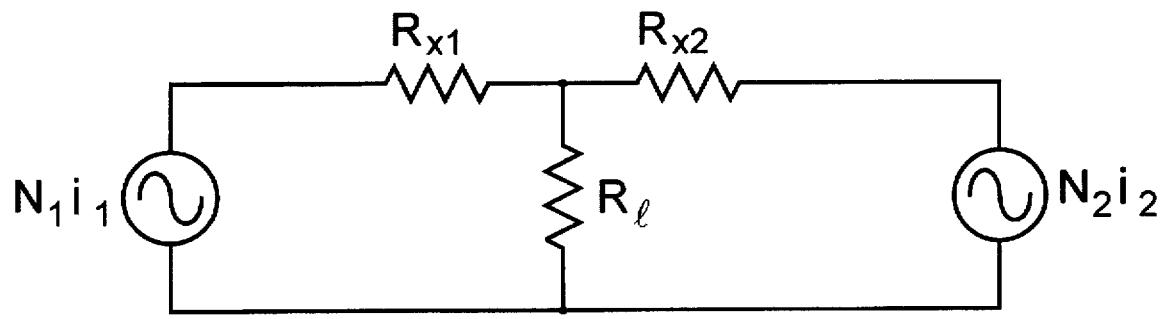
FIG. 6c illustrates a simplified version of the new model of FIG. 6b.
Figure 7A:
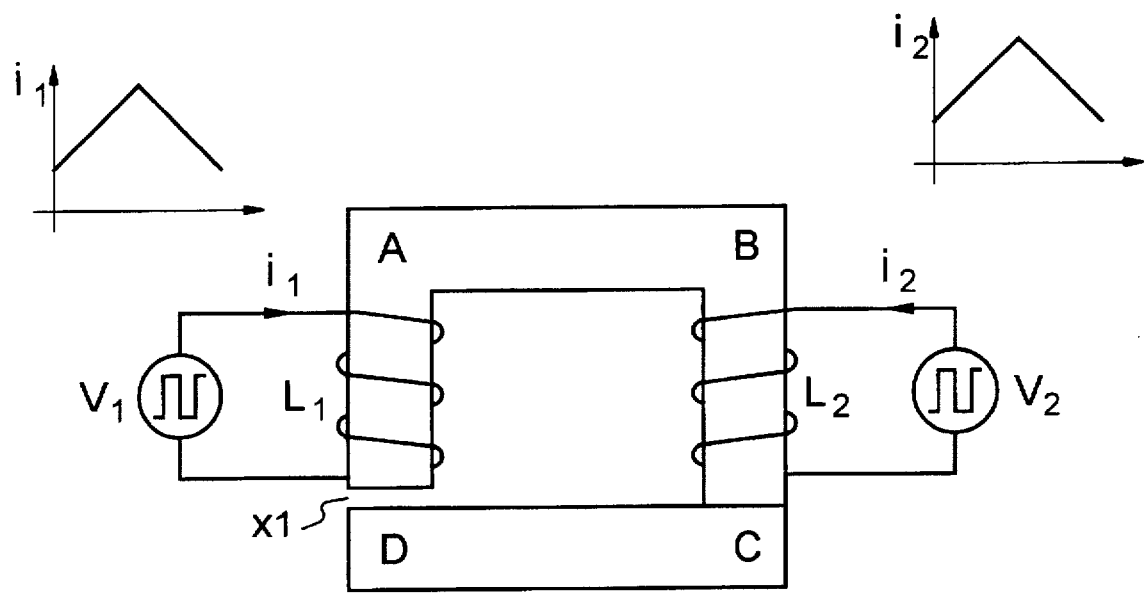
FIG. 7a illustrates new and improved coupled inductors on a UI core with only a single gap in one of the legs for windings in accordance with the present invention.
Figure 7B:
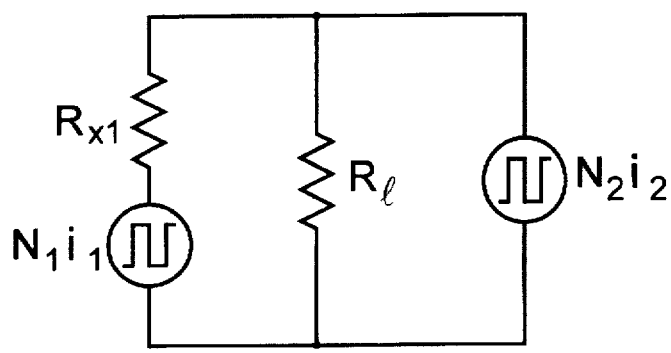
FIG. 7b shows a reluctance model for that improved model.
Figure 7C:
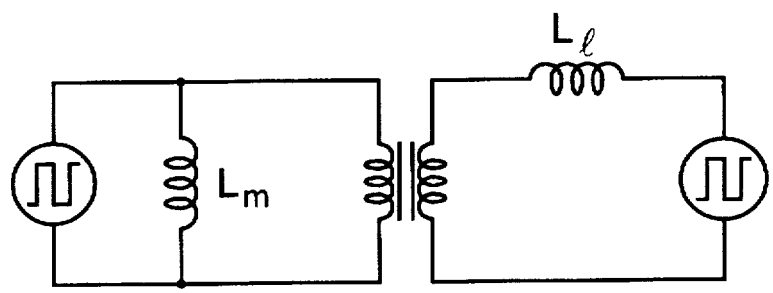
FIG. 7c then shows an inductance model.

As a first example of the present invention, consider a core with an air gap only on one side as shown in FIG. 7a and inductor windings $L_1$ and $L_2$ both have a number N of turns, where N is an integer. The reluctance model for this case of coupled inductors is shown in FIG. 7b using the new reluctance model of FIG. 6b with $R_x=0$ (no gap on the leg for the winding $L_2$). The inductance model shown in FIG. 7c can be obtained by applying duality from FIG. 7b. It should be noted that this inductance model is identical to the conventional model of a transformer with zero primary leakage inductance, secondary leakage inductance equal to $L_2$ and magnetizing inductance equal to $L_m$. From Equation (2) the coupling coefficient is $k_1=1$ so the zero ripple condition of Equation (3) is n=1. Therefore this new coupled inductor structure shown in FIG. 7a achieves zero current ripple with the same number of turns ($N_1=N_2$) on the two windings. Moreover, when used for coupled inductors $L_1$ and $L_2$ in the Ćuk converter of FIG. 2a, it should be noted that the structure has a secondary leakage inductance $L_l$ which helps reduce residual current ripple due to small differences in the voltage waveforms applied to the two windings by the converter. A magnetic structure with well-coupled windings (like a conventional transformer) would have a zero ripple condition n=1 just as the structure of FIG. 7a, but any small difference in the applied voltages $V_1$ and $V_2$ would cause big currents since the overall leakage is very small. This structure of FIG. 7a has various advantages:

- No need for adjustment of the number of turns for zero ripple condition. Moreover, the zero ripple condition is independent of the air-gap thickness, so that if the designer at some point decides that a different leg thickness is needed, such as for saturation reasons, no other change is needed to achieve a zero current ripple design. In a conventional coupled-inductor design, if the air gap increases the primary coupling coefficient $k_1$ decreases and an adjustment of the number of turns is needed.

- No integer number problem for the small number of turns, such as two. This problem is completely eliminated in this structure because the same number of turns for both windings ($N_1=N_2$) provides zero current ripple.

Figure 5A:
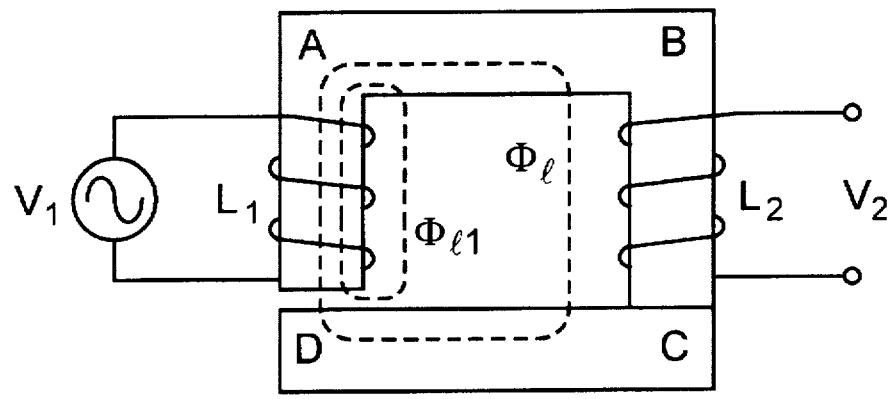
FIGS. 5a, b and c show experimental measurements on a coupled inductor structure with different gap arrangements.
Figure 5B:
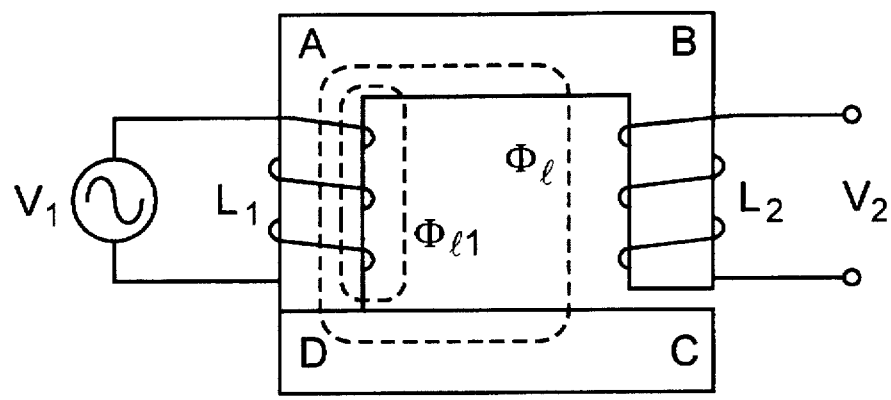
Figure 5C:
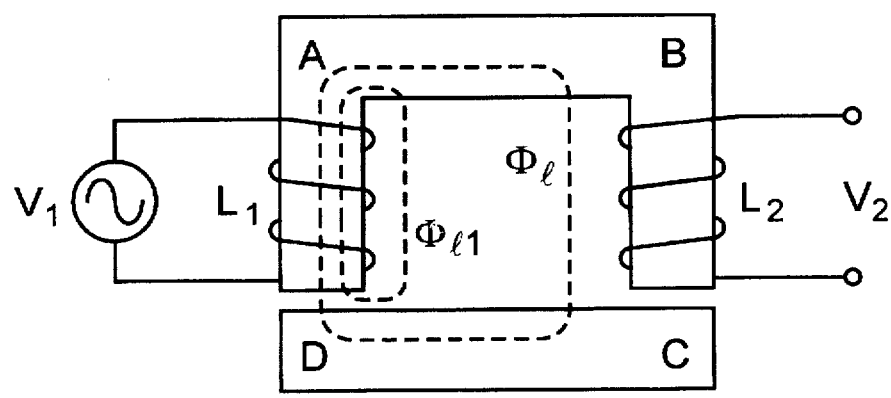

- Greatly reduced radiated noise which could cause malfunctioning of nearby electronic equipment, such as in modules on adjacent PCBs of a computer unless EMI interference shielding is provided. The radiated noise of this structure is much lower than the radiated noise of other coupled-inductor structures as shown in the experiment discussed with reference to FIGS. 5a, 5b and 5c. As explained there, this is due to the fact that most of the core is at a constant magnetic potential.

- Reduced eddy current losses due to leakage flux. (These losses are caused by ac fluxes inducing eddy currents on the conductors.) This structure has negligible ac leakage fluxes ($k_1=1$) and therefore reduced eddy current losses.

- Suitable for "flat magnetics" implementation. The term "flat magnetics" indicates magnetic elements with a low profile (desirable in on-board power supplies to meet the maximum height requirement of electronic circuit board modules) with windings usually realized using on-board printed circuit techniques.

- Eddy current losses are of particular concern in the case of flat magnetics, since the low profile of the magnetics tends to increase leakage fluxes, but the proposed structure of FIG. 7a implemented in the form of "flat magnetics" has reduced eddy current losses due to leakage fluxes, because if a gap is only placed on the input inductor leg A-D, any leakage flux path E-F is shorted by the core flux path B-C.

Different Leg Cross Sections

Figure 8:
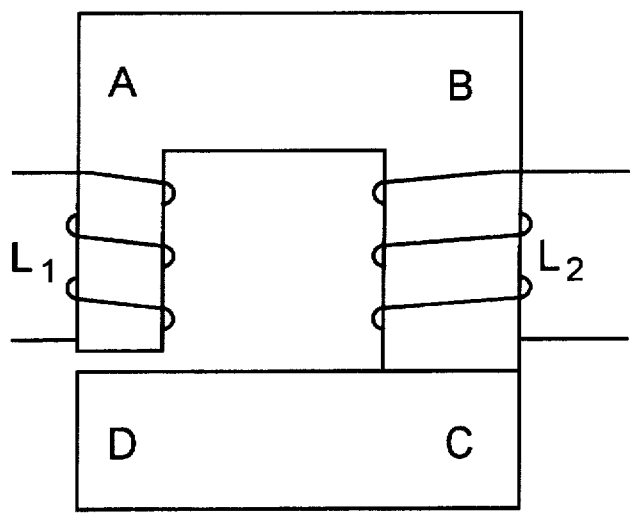
FIG. 8 illustrates a new and further improved structure for coupled inductors $L_1$ and $L_2$ by having only a single gap in one of the legs for windings and having that leg of a UI core of smaller cross section than the other leg.

The new reluctance model allows precise calculation of the peak flux density on each leg of the magnetic core. These fluxes can be significantly different due to the leakage fluxes. For example, it is easy to show that in the case of FIG. 7a the second leg B-C always carries a higher flux. If the magnetic core has a uniform cross section, the first leg A-D will have lower flux density than the second one. It is possible to reduce size and weight of the coupled-inductor core structure by making the various magnetic pieces of different cross section in order to fully utilize the flux capability of the magnetic material. An example is shown in FIG. 8.

Multiple Air Gaps

Since the coupled inductors carry dc currents, air gaps in the magnetic path are needed to prevent magnetic saturation. Magnetic flux crossing the gap tends to spread out, and this fringing flux causes eddy current losses in nearby conductors and EMI (radiated noise). The fringing flux increases with the thickness of the air gap.

Figure 6A:
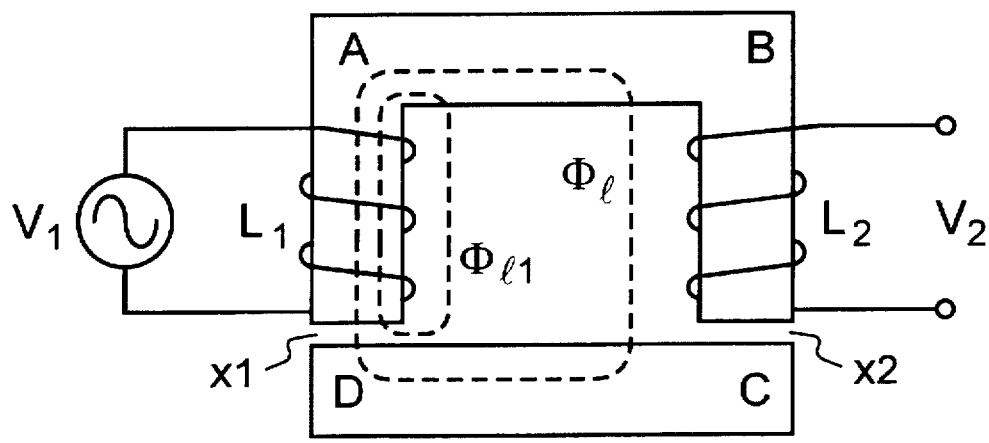
FIG. 6a illustrates coupled inductors on a UI core.
Figure 9:
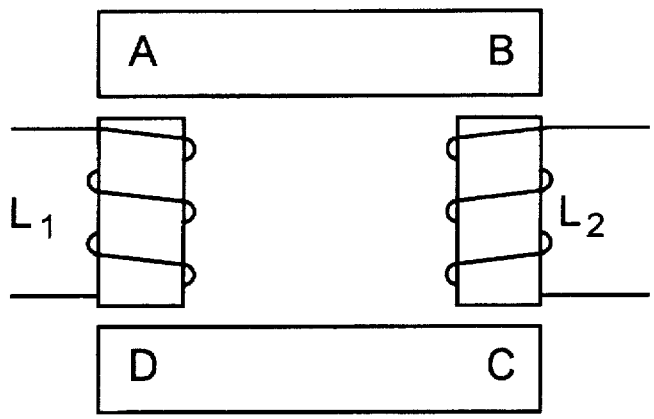
FIG. 9 illustrates still another improved structure for coupled inductors $L_1$ and $L_2$ by having the single gap of the structure in FIG. 7a or FIG. 8 divided into two parts, one on each leg and each divided gap further divided into two parts, one part on the end of each of the legs for the coupled windings in order to reduce the gap dimension of each of the four gaps, thereby reducing leakage flux at the gaps.

A new coupled inductor structure that is an improvement over that of FIG. 6a is disclosed in FIG. 9. The core consists of four I-shaped pieces put together in a rectangular shape with four air gaps, two air gaps for each of the only air gap in each leg of the structure in FIG. 6a. The advantage is that the only air gap in each leg is split, half on each end of the I-shaped pieces of the legs having the coupled inductors $L_1$ and $L_2$, thereby reducing the dimension of the gaps for each leg to reduce fringing flux while maintaining the total gap the same, the therefore the flux reluctances $R_{x1}$ and $R_{x2}$ the same as before splitting the gaps. As a result, eddy current losses and radiated noise are reduced. Another advantage is that the legs for the windings may be readily made of stock core and material of different cross sections if desired. The total core assembly is inexpensively manufactured due to the simple shape of the magnetic pieces.

Flat Magnetics Implementation of Coupled Inductors

Figure 10:
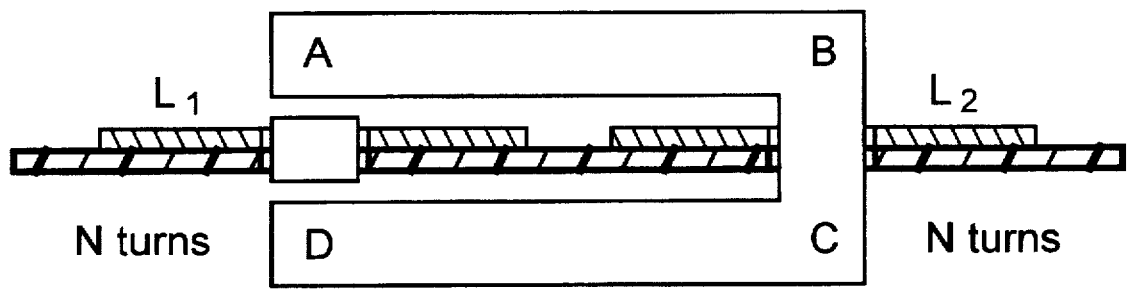
FIG. 10 illustrates that the techniques described with reference to FIG. 9, and by analogy with reference to FIG. 7a and FIG. 8, may be readily utilized in the implementation of coupled inductors in flat magnetics using printed circuit board (PCB) windings.

The techniques for coupled inductors described above can be readily implemented in "flat magnetics" form for applications requiring a low profile, such as a converter package to fit between modules in an electronic system. An example is illustrated in FIG. 10, which shows the coupled inductor structure of FIG. 7a with the same number of turns for inductors $L_1$ and $L_2$ but the single gap in the one leg A-D divided evenly between gaps at opposite ends of an I-shaped core in the leg A-D as shown to reduce fringing flux and with a smaller cross section in leg A-D to reduce foot-print size if desired.

Figure 1A:
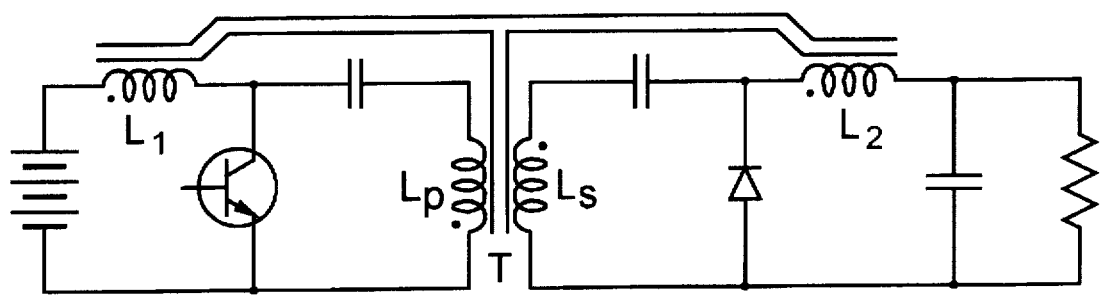
FIG. 1a is a schematic diagram of a prior-art isolated Ćuk converter with integrated magnetics.
Figure 1B:
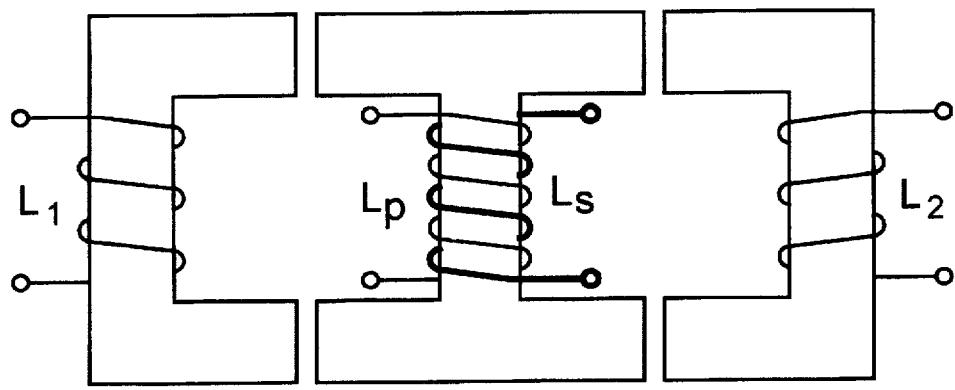
FIGS. 1b and 1c illustrate two alternative structures for the integrated magnetics.
Figure 1C:
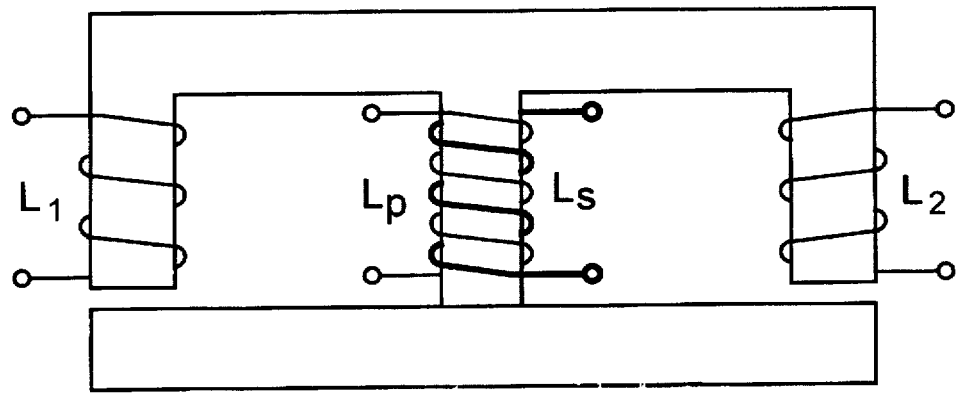
Figure 11A:
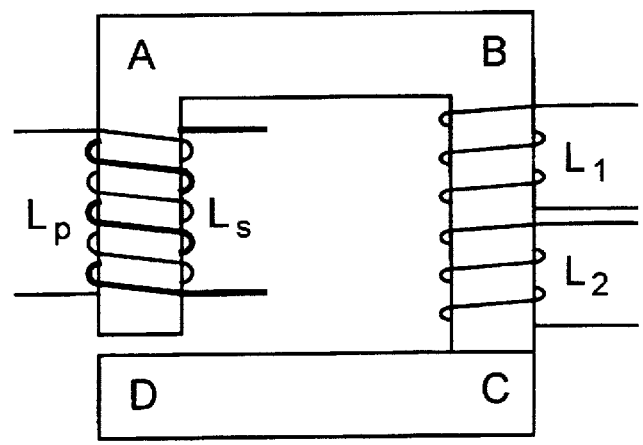
Figure 11B:
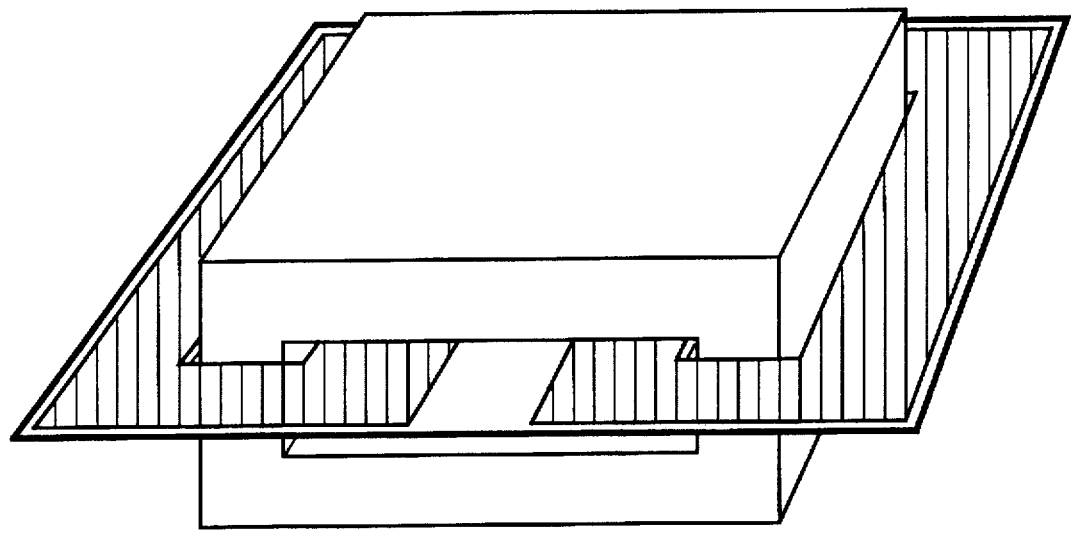
FIG. 11b is an isometric view of a flat structure for the integrated magnetics of FIG. 11a using printed circuit board (PCB) techniques and windings on opposite sides of the PCB as shown FIG. 11c in which is a cross sectional view of a flat PCB structure similar to that of FIG. 11b but with a magnetic core having a gap in both legs A-D and B-C.

FIG. 11a illustrates an improved structure for the integrated magnetics shown in the Ćuk converter of FIG. 1a. It uses a UI magnetic core with a gap in the leg A-D for closely coupled transformer windings $L_p$ and $L_s$ and no gap in the leg B-C for the loosely coupled inductor windings $L_1$ and $L_2$ with the zero-ripple condition of $k_1=N_1/N_2$. FIG. 11b then illustrates implementation of the integrated magnetics of FIG. 11a in a flat (low profile) structure using printed circuit board techniques with the transformer windings $L_p$ and $L_s$ on opposite sides of the board on the left side of the core as in FIG. 11a and the inductor windings $L_1$ and $L_2$ on opposite sides of the board on the right side.

Figure 11C:
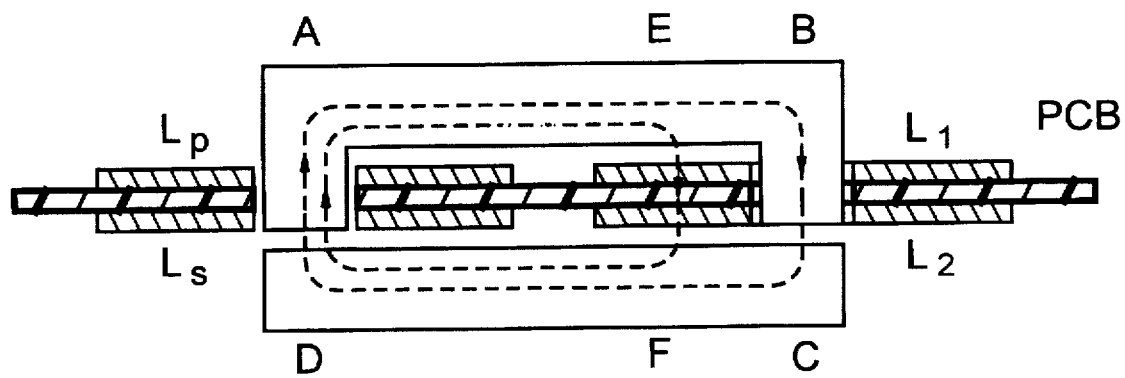
Figure 11D:
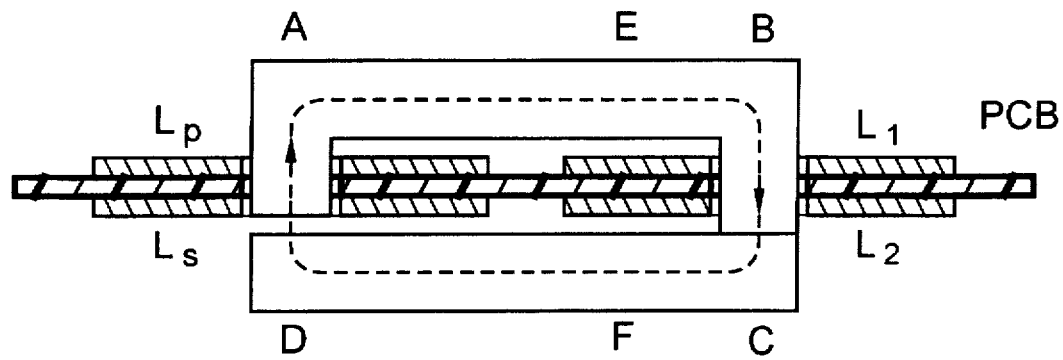
FIG. 11d then shows that if a gap is only placed on the transformer leg A-D, leakage flux $\phi_l$ in a path E-F shown in FIG. 11c is "shorted" by the flux path in the leg B-C of the core for better coupling.

FIG. 11c shows in a cross section view a similar flat integrated magnetics structure having a gap in both legs A-D and B-C. Performance of both structures in FIG. 11b and FIG. 11c are expected to be the same in respect to achievement of zero ripple, but the performance is improved with only one gap, as shown in FIG. 11d, because most of the flux couples with the inductors $L_1$ and $L_2$ as explained more fully with reference to FIGS. 5a and 5c.

Well-Coupled Windings and External Inductors

Figure 12:
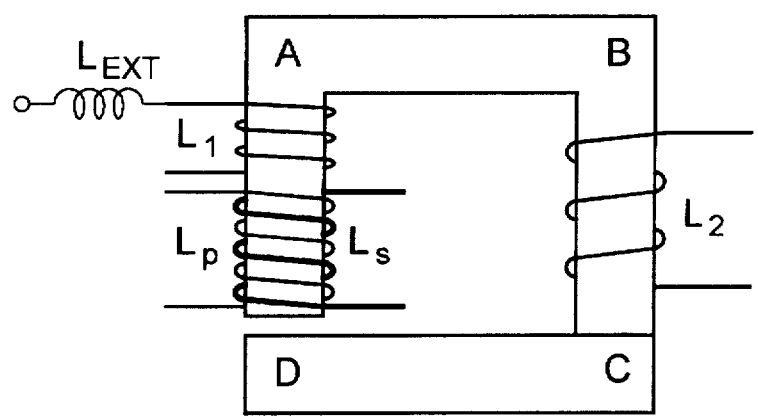
FIG. 12 illustrates a UI core with a single gap on a leg A-D for closely coupled transformer windings $L_p$, $L_s$ and the input inductor winding $L_1$ on the same leg with an external inductor in series for filtering any current ripple in the input inductor.
Figure 13:
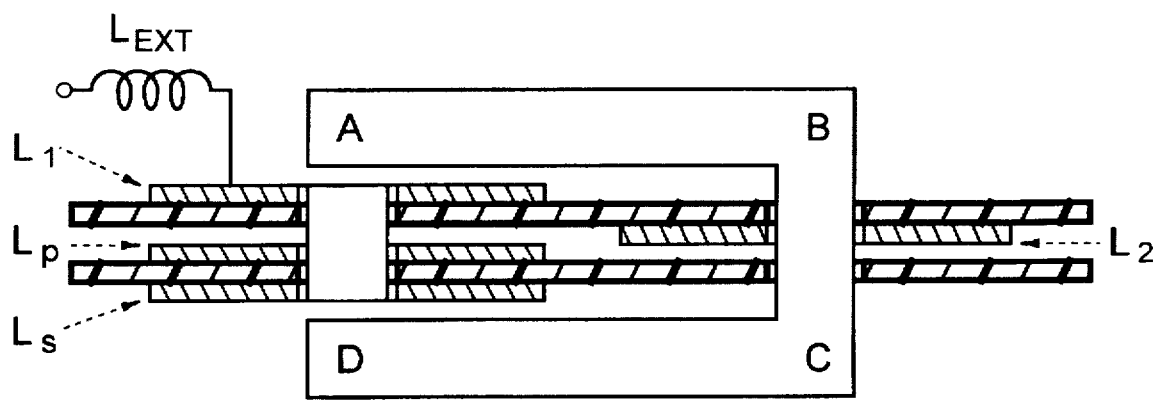
FIG. 13 illustrates in a cross section of two PCBs a low profile PCB implementation of the integrated magnetics of FIG. 12 with two printed circuit boards for the windings of the coupled inductors and the isolation transformer, and with the added feature of dividing the gap in the leg A-D into two parts in order that the gap size of any gap may be reduced to reduce fringing flux losses.

If an integrated magnetics structure has many different windings, such as in the case of having coupled inductors and an isolation transformer in one structure as shown in FIGS. 11a, 11b and 11c for the converter of FIG. 1a implemented with the flat magnetics, it may be difficult to ensure loose coupling between all windings. A solution is to employ a "mixed" approach of using the conventional zero current ripple approach for the inductor windings that can be readily implemented with a loose coupling and make all the remaining windings well-coupled with the ripple-carrying winding or windings. The ripple on the ripple-carrying windings can be reduced by adding a separate external inductor in series with each ripple-carrying winding such as is shown in series with an input inductor winding $L_1$ in FIG. 12 if that input inductor winding cannot be loosely coupled to the other windings because of flat magnetics implementation as shown in FIG. 13. The external inductor does not affect the zero ripple conditions of the other loosely coupled winding $L_2$. The external inductor need not be big, because its only purpose is to decouple the ripple-carrying winding $L_p$ from the zero-ripple winding $L_1$. This solution is suitable for all applications as suggested by the more general diagram of FIG. 12, but is particularly suitable for low-profile applications, because in the case of flat magnetics it is sometimes difficult to realize loosely coupled windings on the same core leg.

In the flat magnetics implementation of integrated coupled inductors and isolation transformer windings shown in FIG. 13 for the converter of FIG. 1a, a gap on one leg (leg A-D) only is split to reduce fringing flux and a third winding for input inductor L, is placed on that leg A-D. Zero-ripple condition of this third winding on the leg is obtained by using an external inductor with that third winding.

Although particular embodiments of the invention have been described and illustrated herein with reference to Ćuk converters, it is important to appreciate that the invention may be used to equal advantage in other switching power converters, such as the Sepic converter, and other analogous circuits. Consequently, it is intended that the claims be construed to cover all such uses of the novel techniques disclosed.

What is claimed is:

1. A switching converter circuit comprising a single-loop core of magnetic material, series input and series output inductors loosely coupled by winding said inductors on opposite legs of said single-loop core, only one of said legs having an effective total gap, said input and output inductors having the same number of turns for zero ripple current in said output inductor.

2. A switching converter circuit as defined in claim 1, wherein said input inductor is wound on said one leg having said effective total gap and said output inductor is wound on the other leg.

3. A switching converter circuit as defined in claim 2, wherein said single-loop core has a smaller cross section in said one leg having said gap.

4. A switching converter circuit as defined in claim 2, wherein said input and output inductors are implemented in a printed circuit board.

5. A switching converter circuit as defined in claim 2, wherein said effective total gap is divided into two parts with one part at each end of said one leg, thereby reducing fringing flux loss at each part of said effective total gap of said one leg by reducing the gap dimension of each part while maintaining said effective total gap of said one leg constant.

6. A switching converter circuit comprising a series input inductor, a series output inductor and an isolation transformer, all having the same number of turns when referred to the primary of said isolation transformer, all wound on a single-loop core of magnetic material having an effective total gap on one leg only, primary and secondary windings of said transformer being wound on said one leg having said gap, said series input and series output inductors being wound loosely coupled on the opposite leg, and said series input and output inductors having zero current ripple.

7. A switching converter circuit as defined in claim 6, wherein said isolation transformer and said input and output inductor are implemented in a printed circuit board.

8. A switching converter circuit as defined in claim 6, including an external inductor in series with said input inductor to ensure loose coupling between said series input and output inductors.

9. A switching converter circuit as defined in claim 8, wherein said isolation transformer and said input and output inductors are implemented in a printed circuit board.

10. A switching converter circuit comprising a series input inductor, a series output inductor, and an isolation transformer, all having the same number of turns when referred to the primary of said isolation transformer, all wound on a single-loop core of magnetic material having an effective total gap on one leg only, primary and secondary windings of said transformer and said input inductor being wound on said one leg having said gap, said series output inductor being wound on the opposite leg, said series input and output inductors having zero current ripple, and an external inductor in series with said input inductor to ensure loose coupling between said series input inductor and said transformer.

11. A switching converter circuit as defined in claim 10, wherein said effective total gap in said one leg is divided into two parts, one part at each end of said one leg.

12. A switching converter circuit as defined in claim 11, wherein said isolation transformer and said input and output inductors are implemented in a printed circuit board.

13. A switching converter circuit comprising series input and series output inductors loosely coupled through a single-loop core of magnetic material having opposite legs, one leg for each of said series input and series output inductors, each of said separate legs having an effective total gap, wherein said effective total gap of each leg is in two parts, one part at each end of each leg, thereby reducing fringing flux loss at each part of said effective total gap of each leg by reducing the dimension of each part while maintaining constant said total effective gap of each leg.

14. A switching converter circuit comprising a single-loop core of magnetic material having opposite legs, an isolation transformer wound on one of said opposite legs, and series input and series output inductors wound on the other of said opposite legs, each of said separate legs having an effective total gap, wherein said effective total gap of each leg is in two parts, one part at each end of each leg, thereby reducing fringing flux loss at each part of said effective total gap of each leg by reducing the dimension of each part while maintaining constant the gap reluctance of said total effective gap of each leg.

15. A switching converter circuit as defined in claim 14, wherein said isolation transformer and said input and output inductors are implemented in a printed circuit board.

16. A switching converter circuit comprising a single-loop core of magnetic material having opposite legs, a series input and a series output inductor loosely coupled on one leg of said single-loop core, and an isolation transformer having primary and secondary windings on the other of said opposite legs, at least one of said legs having an effective total gap, said series input and output inductors having the same number of turns when referred to the primary of said isolation transformer for zero current ripple on both said series input inductor and series output inductor, whereas said transformer primary winding may have a different number of turns.

17. A switching converter circuit as defined in claim 16, wherein said isolation transformer and said input and output inductors are implemented in a printed circuit board.

\* \* \* \* \*